US009455612B2

(12) United States Patent
Hirayama et al.

(10) Patent No.: US 9,455,612 B2
(45) Date of Patent: *Sep. 27, 2016

(54) METHOD OF MANUFACTURING LAMINATED CORE

(75) Inventors: Yuichi Hirayama, Kitakyushu (JP); Kento Aono, Kitakyushu (JP); Naoki Isomura, Kitakyushu (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 8 days.

This patent is subject to a terminal disclaimer.

(21) Appl. No.: 13/885,065

(22) PCT Filed: Oct. 27, 2011

(86) PCT No.: PCT/JP2011/074842
§ 371 (c)(1),
(2), (4) Date: May 13, 2013

(87) PCT Pub. No.: WO2012/077426
PCT Pub. Date: Jun. 14, 2012

(65) Prior Publication Data
US 2013/0228280 A1      Sep. 5, 2013

(30) Foreign Application Priority Data
Dec. 7, 2010    (JP) .................................. 2010-272769

(51) Int. Cl.
*H02K 15/03*      (2006.01)
(52) U.S. Cl.
CPC .................................... *H02K 15/03* (2013.01)

(58) Field of Classification Search
CPC ......... H02K 1/27; H02K 15/02; H02K 15/03
USPC ........................ 156/293; 310/156.53; 29/598; 264/328.4, 328.5; 425/543, 544
See application file for complete search history.

(56) References Cited

U.S. PATENT DOCUMENTS

| 4,312,119 A | 1/1982 | Perucchi et al. |
| 4,315,173 A | 2/1982 | Calfo et al. |

(Continued)

FOREIGN PATENT DOCUMENTS

| CN | 101356711 A | 1/2009 |
| CN | 101390273 A | 3/2009 |

(Continued)

OTHER PUBLICATIONS

International Search Report for PCT/JP2011/074842, Mailing Date of Jan. 31, 2012.

(Continued)

*Primary Examiner* — Jeff Aftergut
*Assistant Examiner* — Jaeyun Lee
(74) *Attorney, Agent, or Firm* — Westerman, Hattori, Daniels & Adrian, LLP

(57) ABSTRACT

A method of manufacturing a laminated core includes inserting permanent magnets 14 into magnet insertion holes 12, 12a of a core body 13; injecting a resin 18 into the holes 12, 12a from resin reservoir pots 17 in the die 15 (16) to fix the magnets 14; placing a dummy plate 19 between the die 15 having the pots 17 and the body 13, the plate 19 having gate holes 35, 35a guiding the resin 18 from the pots 17 into the holes 12, 12a, the hole 35 (35a) overlapping with both of a part of the hole 12 (12a) and a surface of the body 13; poring the resin 18 via the holes 35, 35a and curing the resin 18 in the holes 12, 12a; and separating the plate 19 from the body 13 to remove the resin 18 overflowed from the holes 12, 12a.

4 Claims, 10 Drawing Sheets

(56) References Cited

U.S. PATENT DOCUMENTS

| | | | |
|---|---|---|---|
| 4,614,022 | A | 9/1986 | Bibby et al. |
| 5,859,486 | A | 1/1999 | Nakahara et al. |
| 5,893,205 | A | 4/1999 | McClelland |
| 6,167,610 | B1 | 1/2001 | Nakahara et al. |
| 7,653,984 | B2 | 2/2010 | Amano et al. |
| 7,854,056 | B2 | 12/2010 | Watanabe et al. |
| 7,950,133 | B2 | 5/2011 | Amano et al. |
| 8,020,280 | B2 | 9/2011 | Fukumaru et al. |
| 8,578,592 | B2 * | 11/2013 | Nagai et al. ............ 29/598 |
| 2008/0276446 | A1 | 11/2008 | Amano et al. |
| 2009/0026867 | A1 | 1/2009 | Haruno et al. |
| 2009/0174273 | A1 | 7/2009 | Watanabe et al. |
| 2010/0026127 | A1* | 2/2010 | Mizutani et al. ...... 310/156.53 |
| 2010/0083486 | A1* | 4/2010 | Amano et al. ............ 29/609 |
| 2011/0000079 | A1 | 1/2011 | Fukumaru et al. |
| 2012/0222289 | A1 | 9/2012 | Nagai et al. |
| 2012/0324719 | A1 | 12/2012 | Sasaki et al. |
| 2013/0162063 | A1 | 6/2013 | Sasajima |
| 2013/0228280 | A1 | 9/2013 | Hirayama et al. |
| 2014/0103574 | A1 | 4/2014 | Ishimatsu |
| 2014/0124980 | A1 | 5/2014 | Nagai et al. |

FOREIGN PATENT DOCUMENTS

| | | |
|---|---|---|
| CN | 101490928 A | 7/2009 |
| JP | 11-262205 A | 9/1999 |
| JP | 2002-34187 A | 1/2002 |
| JP | 2002-247784 A | 8/2002 |
| JP | 2005-287134 A | 10/2005 |
| JP | 3786946 B1 | 6/2006 |
| JP | 2006-197693 A | 7/2006 |
| JP | 2006-211748 A | 8/2006 |
| JP | 2006-238584 A | 9/2006 |
| JP | 2006-345600 A | 12/2006 |
| JP | 2007-068356 A | 3/2007 |
| JP | 2007-215301 A | 8/2007 |
| JP | 2007-318942 A | 12/2007 |
| JP | 2008-36671 A | 2/2008 |
| JP | 2008-042967 A | 2/2008 |
| JP | 2008-054376 A | 3/2008 |
| JP | 2008-154436 A | 7/2008 |
| JP | 2008-263722 A | 10/2008 |
| JP | 2009-077547 A | 4/2009 |
| JP | 2009-100634 A | 5/2009 |
| JP | 2009-195011 A | 8/2009 |
| JP | 2009-303485 A | 12/2009 |
| JP | 4414417 B2 | 2/2010 |
| JP | 2010-158164 A | 7/2010 |
| JP | 2010-187535 A | 8/2010 |
| JP | 2010-246266 A | 10/2010 |
| JP | 2011-55687 A | 3/2011 |
| JP | 4688505 B2 | 5/2011 |
| JP | 2012-10572 A | 1/2012 |
| JP | 4991900 B2 | 8/2012 |
| WO | 2007/026900 A1 | 3/2007 |
| WO | 2008/007679 A1 | 1/2008 |
| WO | 2011/145399 A1 | 11/2011 |

OTHER PUBLICATIONS

Chinese Office Action dated Oct. 10, 2014, issued in corresponding CN Application No. 201180039235.6 (6 pages).
Japanese Office Action dated Sep. 30, 2014, issued in corresponding JP Application No. 2010-272769 (3 pages).
Non-Final Office Action dated Sep. 11, 2014, issued in U.S. Appl. No. 13/885,065. (13 pages).
International Search Report for PCT/JP2011/074972, mailing date of Jan. 13, 2012 (2 pages).
Office Action dated Aug. 5, 2014, issued in corresponding Japanese Patent Application No. 2012-171366 (2 pages).
Office Action dated Sep. 30, 2014, issued in corresponding Japanese Patent Application No. 2010-278335 (2 pages).
Notification of Reasons for Refusal dated Sep. 17, 2013, issued by JPO on Japanese Patent application No. 2013-161703 (3 pages).
International Search Report of PCT/JP20111058452, mailing date of Jun. 28, 2011 (2 pages).
Notice of Allowance dated Aug. 13, 2013, issued in U.S. Appl. No. 13/509,190 (8 pages).
Ex Parte Quayle dated Feb. 28, 2013, issued in U.S. Appl. No. 13/509,190. (9 pages).
Non-Final Office Action dated Jun. 16, 2015, issued in U.S. Appl. No. 13/885,050 (21 pages).
Final Office Action dated Jan. 4, 2016, issued in U.S. Appl. No. 14/072,241 (7 pages).
Final Office Action dated Dec. 17, 2015, issued in U.S Appl. No. 13/885,050 (19 pages).
Office Action dated Dec. 21, 2015, issued in corresponding U.S. Appl. No. 14/049,770 (21 pages).
Notification of Reasons for Refusal by SIPO dated Oct. 9, 2015 on Chinese patent application No. 201310471440.0; with English translation. (12 pages).
Notification of Reasons for Refusal by SIPO dated Oct. 21, 2015 on Chinese patent application No. 201310540651.5; with English translation. (18 pages).
Notification of Reasons for Refusal dated Mar. 14, 2014, by SIPO on Chinese patent application No. 201210208937.9, with English translation. (6 pages).
Notification of Reasons for Refusal issued by JPO dated Mar. 10, 2015 on Japanese patent application No. 2011-139741; with English translation. (8 pages).
English translation of Japanese Office Action dated Sep. 30, 2014, issued in corresponding JP Application No. 2010-272769 submitted on Dec. 19, 2014.
English translation of Japanese Office Action dated Aug. 5, 2014, issued in corresponding Japanese Patent Application No. 2012-171366 submitted on Oct. 30, 2015.
English translation of Japanese Office Action dated Sep. 30, 2014, issued in corresponding Japanese Patent Application No. 2010-278335 submitted on Oct. 30, 2015.
English translation of Japanese Office Action dated Sep. 17, 2013 issued by Jpo on Japanese Patent Application No. 2013-161703 submitted on Oct. 30, 2015.
English translation of Chinese Office Action dated Oct. 10, 2014, issued in corresponding Cn Application No. 201180039235.6 submitted on Dec. 19, 2014.
Second Notice of Reasons for Refusal dated May 30, 2016 by SIPO on Chinese patent application No. 2013104714404 including English language translation (9 pages).
Final Office Action dated Jun. 30, 2016, issued in U.S. Appl. No. 14/049,770 (11 pages).
Decision of Patent Grant dated on Jul. 15, 2016 by JPO on Japanese patent application No. 2012-227126, including English language translation (6 pages), Aug. 30, 2016.
Final Office Action dated june 14, 2016, issued in U.S. Appl. No. 14/072,241 (5 pages).
Second Notce of Reasons for Refusal dated on Jun. 22, 2016 by SIPO on Chinese patent application No. 201310540651.5 (10 pages).

* cited by examiner

PRIOR ART

METHOD OF MANUFACTURING LAMINATED CORE

TECHNICAL FIELD

The present invention relates to a method of manufacturing a laminated core, including resin-sealing permanent magnets respectively placed in magnet insertion holes provided in a core body. The present invention particularly relates to a method for pouring the resin into the magnet insertion holes of the core body through a dummy plate attached to a surface of the core body, and resin-sealing the permanent magnets in the core body.

BACKGROUND ART

Conventionally, in manufacture of a rotor of a motor used for an automobile or a home electric appliance, a plurality of magnet insertion holes are provided in an annular core body, where the number of the holes corresponds to the number of magnetic poles, and unmagnetized permanent magnets are sealed in the holes with resin. In this technique, while the core body with the permanent magnets inside the magnet insertion holes is held between an upper die and a lower die, a thermosetting resin is injected into the holes via runners from resin reservoir pots provided in the upper die or the lower die.

However, after the resin-sealing process, a laminated core (i.e., the core body with the magnets resin-sealed therein) needs to be detached from between the upper die and the lower die, and a surface of the laminated core needs to be cleaned by removing the cured resin adhering around gates of the magnet insertion holes, which results in poor workability. In light of this, for example, Patent Literature 1 discloses a technique of placing a dummy plate between a core body with permanent magnets inserted therein and an upper die or a lower die having resin reservoir pots, sealing the magnets with resin, and thereafter removing residual resin together with the dummy plate from a laminated core.

CITATION LIST

Patent Literature

[Patent Literature 1] Japanese Unexamined Patent Application Publication No. 2008-54376

SUMMARY OF INVENTION

Technical Problem

As shown in FIGS. 10(A) and 10(B), when a dummy plate 61 is detached together with a residual resin 62 from a laminated core 60, a dent (depressed portion) 64 may be made in a surface of cured resin injected in a magnet insertion hole 63. In order to prevent the dent 64 from forming, a pore diameter of a gate hole at an end of a runner (resin passage) provided between the resin reservoir pot and the magnet insertion hole is reduced compared with a pore diameter of a gate hole in a conventional method, and an area of contact between the gate hole and the magnet insertion hole is thus narrowed. In this case, however, a flow rate of the resin is reduced, and the magnet insertion hole cannot be filled up with the resin within a predetermined period for pouring the resin. As a result, a part of the magnet insertion hole remains unfilled with the resin.

The reduced pore diameter of the gate hole makes it difficult to remove the residual resin from the dummy plate and to clean the gate hole clogged with the resin. Accordingly, a repeated use of the dummy plate is prevented in manufacture of the laminated core. In FIGS. 10(A) and 10(B), reference signs 66 and 67 indicate the lower die and the permanent magnet, respectively.

The present invention has been made in view of the above circumstances, and it is an object of the present invention to provide a method of manufacturing a laminated core including using a dummy plate in a resin-sealing process, in which the dummy plate can be easily detached and resin injected in magnet insertion holes can be greatly prevented from being hollowed.

Solution to Problem

To accomplish the above object, a first aspect of the present invention provides a method of manufacturing a laminated core, comprising: laminating a plurality of core sheets to form a core body having a plurality of magnet insertion holes in a circumferential direction, inserting permanent magnets into the respective magnet insertion holes, and injecting a resin from resin reservoir pots into the magnet insertion holes to fix the permanent magnets while holding the core body between an upper die and a lower die, the reservoir pots provided in one of the upper die and the lower die, the method further comprising: placing a dummy plate between the core body and the die having the resin reservoir pots, the dummy plate having gate holes guiding the resin from the resin reservoir pots into the magnet insertion holes, each of the gate holes overlapping with both of a part of the magnet insertion hole and a surface of the core body, pouring the resin into the magnet insertion holes via the gate holes and curing the poured resin, and separating the dummy plate from the core body to remove the resin overflowed from the magnet insertion holes.

Here, the laminated core is a laminated rotor core. The present invention is applicable to both of a general inner-rotor-type motor and a general outer-rotor-type motor. The outer-rotor-type motor has a stator disposed in a center of the motor and a rotatable rotor disposed outside the stator.

As the dummy plate, it is preferable to use a metal plate made of stainless steel, steel or aluminum. However, a hard ceramic plate can also be used as the dummy plate.

It is further preferable to make a surface of the dummy plate into a surface easily detachable from the resin (i.e., to perform surface finishing of the dummy plate) in advance by nickel-plating or chrome-plating in addition to by fluorine-coating or silicon-coating, for example.

In addition, the gate hole of the dummy plate can be any of a variety of shapes including a circular shape and a rectangular shape in a plan view. Furthermore, a cross-section of the gate hole can be a tapered shape extending from the core body to the die having the resin reservoir pots. The tapered gate hole facilitates the removal of the residual resin which remains attached to the gate hole after the injection of the resin.

A second aspect of the present invention according to the method of the first aspect provides a method of manufacturing a laminated core, wherein the resin from the resin reservoir pots is injected into the gate holes via runners, the runner provided in a surface of the die having the resin reservoir pots, the surface of the die being, in contact with the core body.

A third aspect of the present invention according to the method of the first aspect provides a method of manufacturing a laminated core, wherein each resin-discharge area of the resin reservoir pots partly overlaps with each of the gate holes, and the resin from the resin reservoir pots is pressed directly into the gate holes.

A fourth aspect of the present invention according to the method of the first aspect provides a method of manufacturing a laminated core, wherein the resin from the resin reservoir pots is pressed into the gate holes via runners provided in the dummy plate, each of the runners having a groove shape.

A fifth aspect of the present invention according to the method of the first aspect provides a method of manufacturing a laminated core, wherein the dummy plate includes a first plate and a second plate, the first plate having pierced holes forming runners, each of the runners guiding the resin pressed from the resin reservoir pots into the gate holes, the second plate being in contact with the core body, the second plate having the gate holes.

A sixth aspect of the present invention according to the method of the first to the fifth aspects provides a method of manufacturing a laminated core, wherein the laminated core is an inner rotor, and each of the gate holes overlaps with each of the magnet insertion holes from each radially inward side of the magnet insertion holes.

A seventh aspect of the present invention according to the method of the first to the fifth aspects provides a method of manufacturing a laminated core, wherein the laminated core is an outer rotor, and each of the gate holes overlaps with each of the magnet insertion holes from each radially outward side of the magnet insertion holes.

An eighth aspect of the present invention according to the method of the first to the seventh aspects provides a method of manufacturing a laminated core, wherein the core body includes a through-hole in a center of the core body; the core body includes a positioning means A provided in the through-hole, the positioning means A formed by one of a projecting portion and a key groove; the core body is arranged between the upper die and the lower die in a way that the core body is attached to a fixture having a support shaft and a flat plate, the support shaft to be inserted in the through-hole, the support shaft having a positioning means B engaging with the positioning means A, the flat plate having the support shaft arranged in a vertical manner; and the dummy plate is arranged in a predetermined position in the core body, the dummy plate having positioning means C engaging with the positioning means B.

Advantageous Effects of Invention

In the method of manufacturing the laminated core according to the present invention, the gate hole is arranged in the dummy plate such that the gate hole overlaps with both of the surface of the core body and the magnet insertion hole, and the resin is injected through the gate hole. Accordingly, when the dummy plate is removed from the surface of the core body after the resin is cured, the resin is easily broken at an end (corner) of the magnet insertion hole. Therefore, the resin around the gate hole is not torn off together with the dummy plate, which can prevent the resin from being dented.

A required (optimal) region of the gate hole for injecting the resin is lapped over the magnet insertion hole, and the resin is injected therethrough. Thus, the resin can be injected throughout the magnet insertion hole even when a flow rate and an amount of the resin are decreased. In addition, the flow rate and the amount of the resin can be optimized by changing the overlap region of the gate hole and the magnet insertion hole depending on a type of resin and a volume of the magnet insertion hole.

The dummy plate includes the gate hole, the region of which required optimal) for injecting the resin is lapped over the magnet insertion hole, and the resin is injected through the region. Thus, it is not necessary to reduce an area of opening of the gate hole. Accordingly, the removal of the residual resin from the dummy plate and an inside cleaning of the gate hole can be facilitated, and the dummy plate can be used repeatedly.

DESCRIPTION OF EMBODIMENTS

Figure 1:
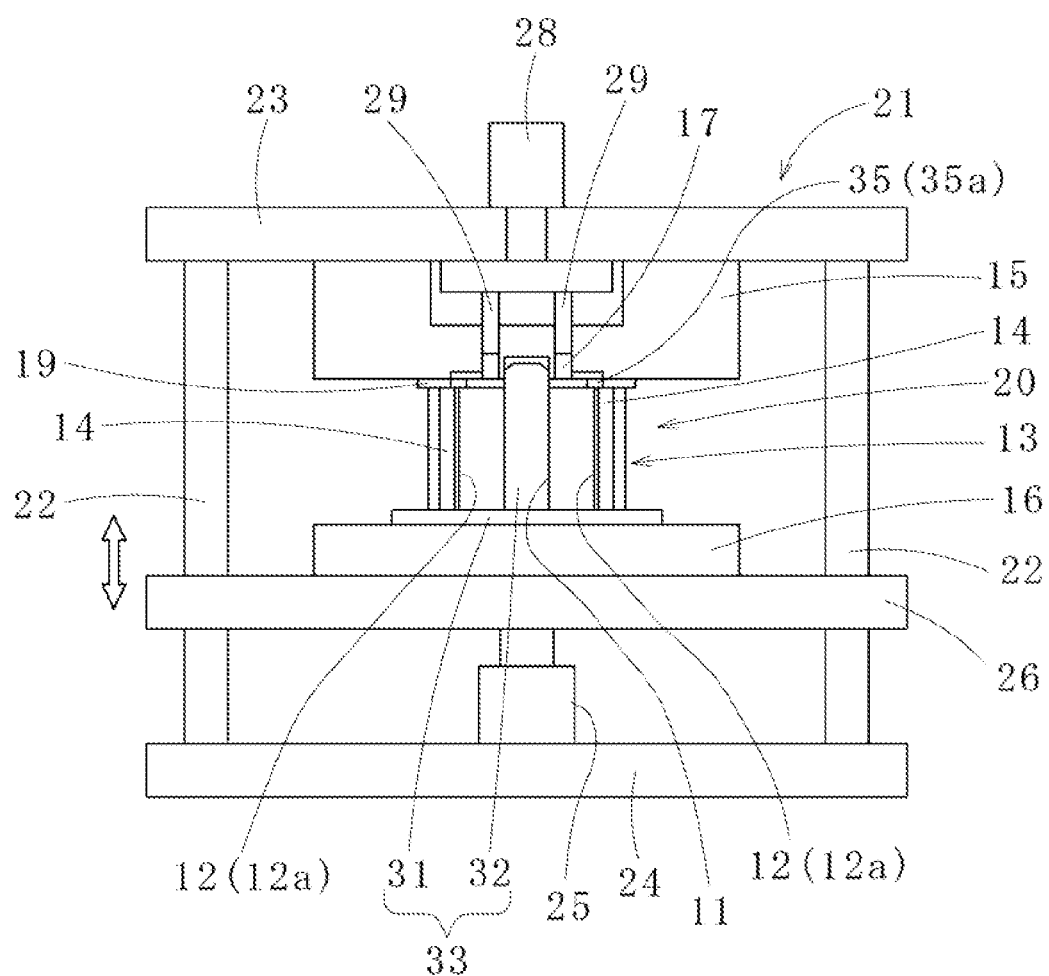
FIG. 1 is a partial cross-sectional elevation view of a die device used in a method of manufacturing a laminated core according to a first embodiment of the present invention.
Figure 2:
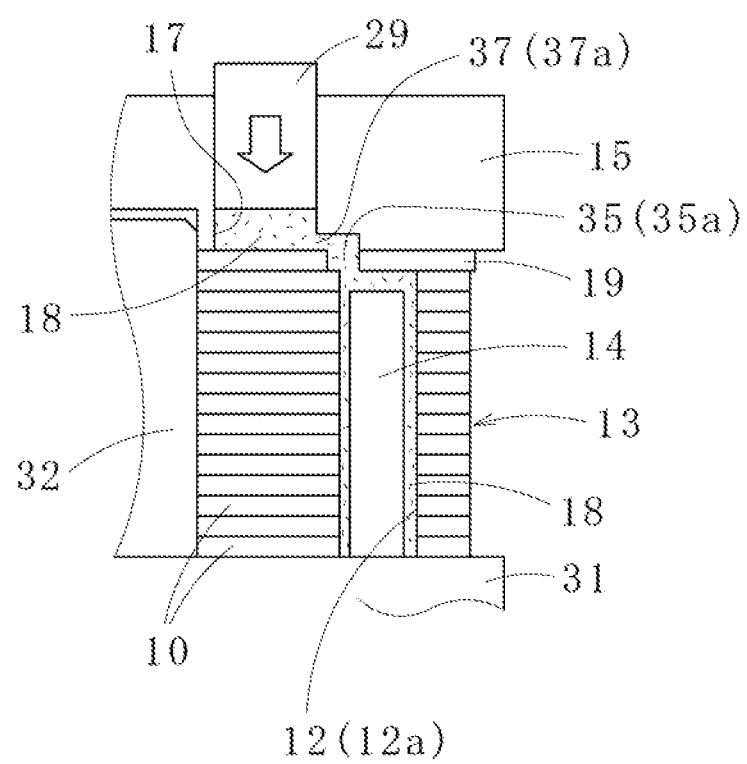
FIG. 2 is an enlarged cross-sectional view showing a main part of the method of manufacturing the laminated core.

Referring to the accompanying drawings, embodiments of the present invention will be described for a better understanding of the present invention. As shown in FIGS. 1 and 2, a first embodiment of the present invention provides. a method of manufacturing a laminated core (e.g., a laminated rotor core used for a motor rotor) 20 including laminating a plurality of core sheets 10 to form a core body 13 having a central through-hole 11 and plural pairs of magnet insertion holes 12, 12a located around the through-hole 11, inserting permanent magnets. 14 in each of the magnet insertion holes 12, 12a, and while holding the core body 13 between an upper die 15 and a lower die 16 (both are examples of die devices), injecting a resin (usually, a thermosetting resin such as an epoxy resin) 18 into the magnet insertion holes 12, 12a via a dummy plate 19 from resin reservoir pots 17 each having a circular cross-section and each provided in the upper the 15 (or the lower die 16) to fix the permanent magnets 14. Hereinafter, a detailed description will be given.

A description will be given on a die device 21 including the upper die 15 and the lower die 16.

The die device 21 includes four guide posts 22, an upper fixing plate 23 and a lower fixing plate 24 respectively placed in an upper side and a lower side of the guide posts 22, a cylinder 25 that is an example of an elevating means, an elevating plate 26 located in an intermediate part of the die device 21 and moved up and down by the cylinder 25, the upper die 15 supported by the upper fixing plate 23, and the lower die 16 fixed on the elevating plate 26. The upper die 15 includes the plural resin reservoir pots 17. The resin 18 inside each of the resin reservoir pots 17 is pressed toward the core body 13 from above by using a plunger 29 operated by a cylinder 28.

The core body 13 is held between the upper die 15 and the lower die 16, in which the core body 13 is mounted on a carrier 33 (an example of a fixture). The carrier 33 includes a mounting table 31 made of a flat plate and a support shaft 32 vertically placed in a center of the mounting table 31. In this embodiment, the resin 18 is injected into the core body 13 from an upper side of the core body 13. Alternatively, it is possible that the core body 13 is set upside down (with or without the carrier 33) and the resin is injected into the magnet insertion holes 12, 12*a* having the permanent magnets inserted therein beforehand from the resin reservoir pots provided in the lower die.

Figure 3:
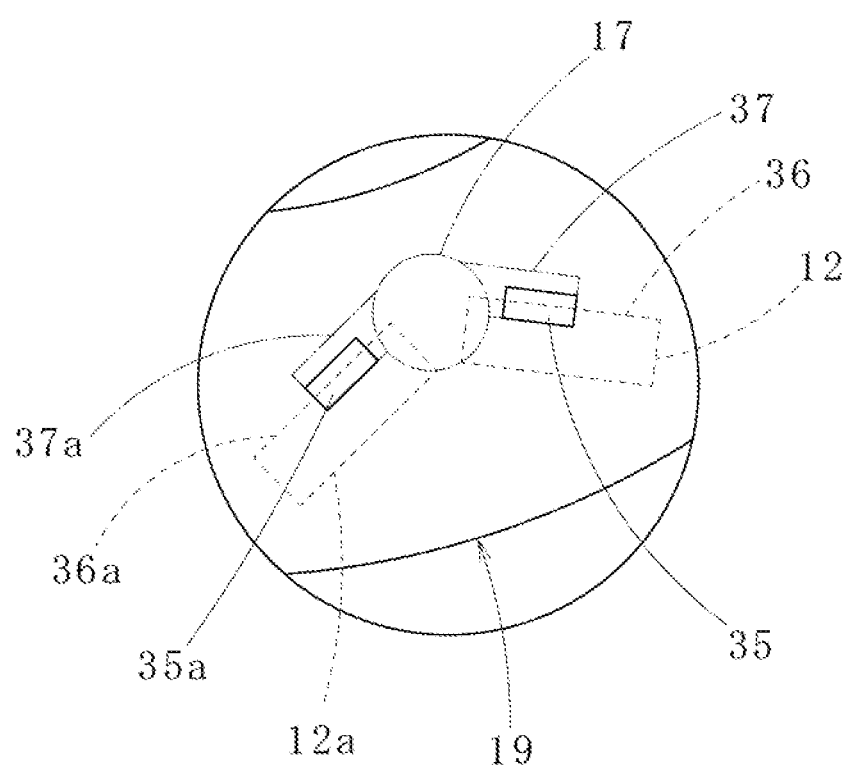
FIG. 3 is a plan view showing a main part of the method of manufacturing the laminated core.

The dummy plate 19 is made of a hard and durable plate, such as a stainless plate, and is arranged between the core body 13 and the upper die 15 having the resin reservoir pots 17. As shown in FIGS. 2 and 3, the dummy plate 19 includes gate holes 35, 35*a* overlapping both of (a) parts in a radially inward direction of the pair of the magnet insertion holes 12, 12*a* and (b) surfaces of the core body 13 located inward from the magnet insertion holes 12, 12*a*. In other words, the gate holes 35, 35*a* are provided in the dummy plate 19 such that outlines 36, 36*a* in a radially inward direction of the magnet insertion holes 12, 12*a* divide the gate holes 35, 35*a* into two parts, respectively, in a plan view. The upper die 15 includes runners 37, 37*a* on a side in contact with the core body 13, so that the resin 18 is guided to the gate holes 35, 35*a* from the resin reservoir pots 17 via the runners 37, 37*a*, and the resin 18 is injected into the magnet insertion holes 12, 12*a*.

The core body 13 includes the through-hole 11 in a center thereof and a positioning means A formed by a projection (not shown) or a key groove (not shown) in the through-hole 11. The carrier 33 includes the mounting table 31 and the support shaft 32 vertically provided in the table 31. The support shaft 32 includes a positioning means B to be inserted in the through-hole 11 and fitted with the positioning means A. The core body 13 is arranged between the upper die 15 and the lower die 16 in a way that the core body 13 is mounted on the carrier 31. The dummy plate 19 includes a positioning means C to be fitted with the positioning means B, and is arranged in a predetermined position on the core body 13. In this embodiment, the upper die 15 includes a hole into which an upper side of the support shaft 32 is inserted.

Figure 4:
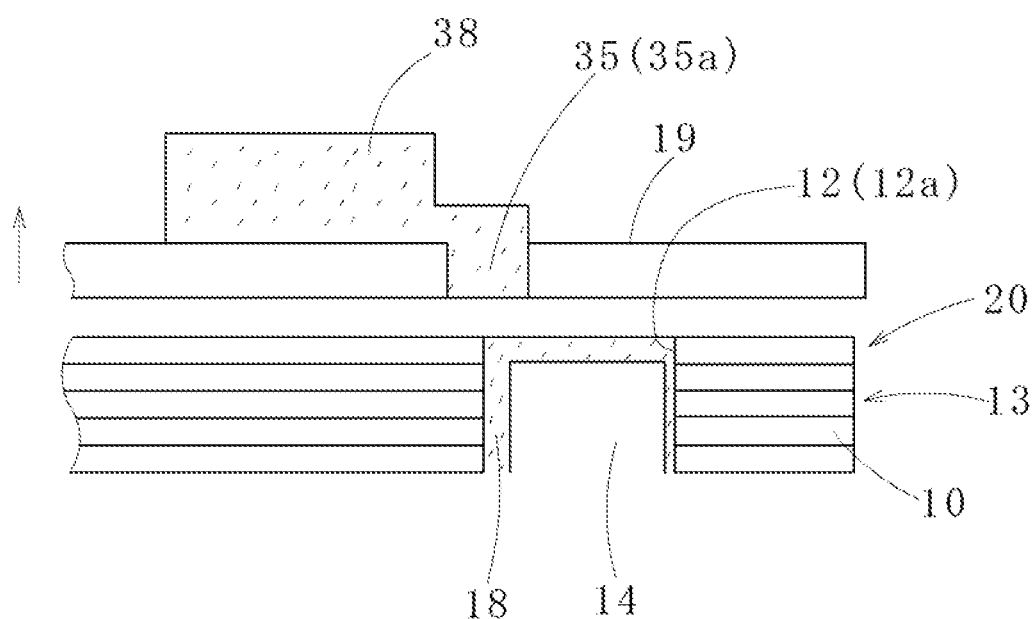
FIG. 4 is an explanatory diagram showing a process of the method of manufacturing the laminated core.

After the magnet insertion holes 12, 12*a* are sealed with the resin 18 and the resin 18 is cured, the core body 13 is separated from the upper die 15 and the dummy plate 19 is removed from the core body 13 (precisely, the core body 13 at this stage is the laminated core 20 having the permanent magnets 14 sealed in the magnet insertion holes 12, 12*a*), and then, as shown in FIG. 4, a residual resin 38 is placed on the dummy plate 19. Here, a cross-sectional area of the resin 18 in the gate hole 35 (or 35*a*) of the dummy plate 19 and a cross-sectional area of the resin 18 in the magnet insertion hole 12 (or 12*a*) are rapidly changed at a boundary thereof. When the dummy plate 19 is subjected to a load to be separated from the laminated core 20, stress concentration is caused at an inner corner of the boundary (i.e., a constricted neck portion), the resin cracks at the neck portion and this crack extends along an inlet face of the magnet insertion hole 12 (or 12*a*), and the resin 18 breaks eventually along the inlet face. Therefore, a conventional problem of a dent of the resin 18 can be prevented.

Figure 5:
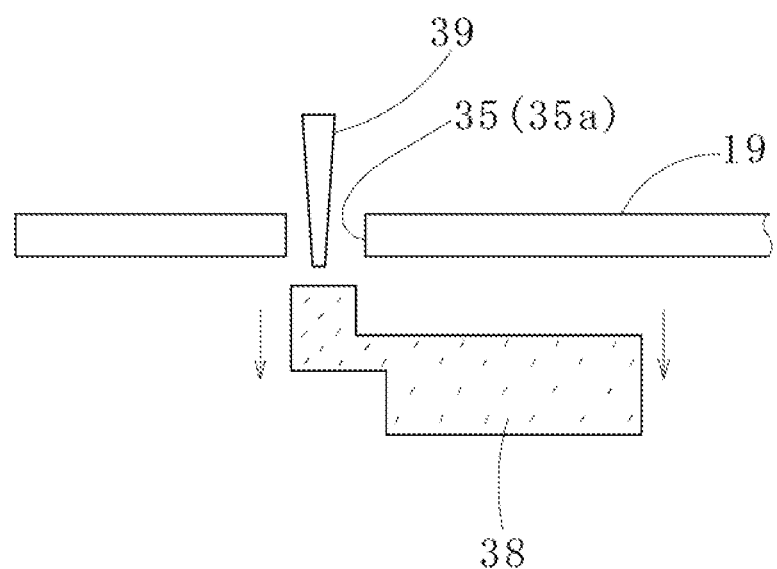
FIG. 5 is an explanatory diagram showing a process of the method of manufacturing the laminated core.

As shown in FIG. 5, the dummy plate 19 is turned over and cleaned by pushing a part of the residual resin 38 clogging in the gate hole 35 (or 35*a*) by a pointed tool 39. Then, the residual resin 38 is removed and fallen from the dummy plate 19. and thus the dummy plate 19 can be used repeatedly.

Figure 6:
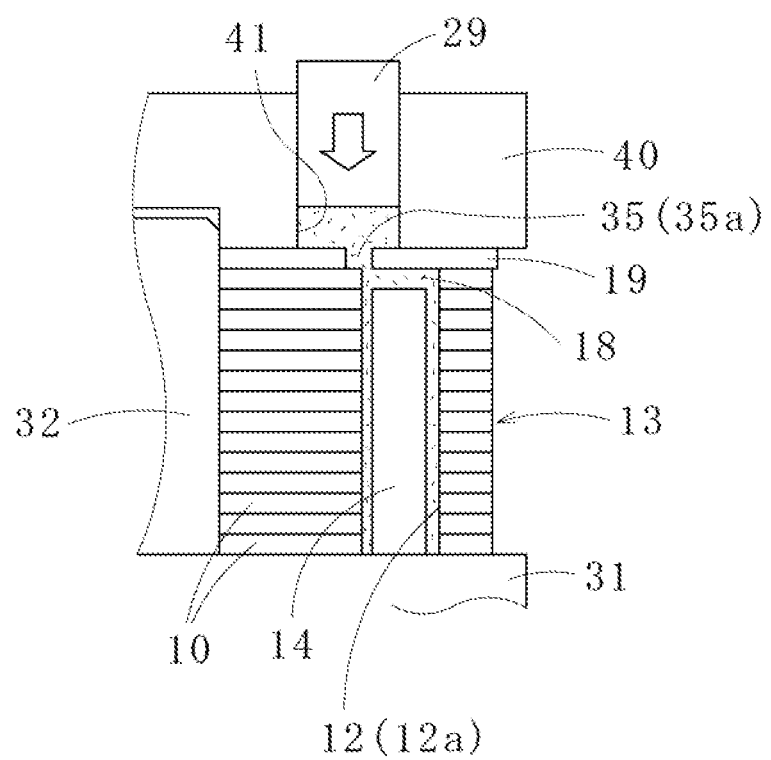
FIG. 6 is an explanatory diagram showing a method of manufacturing a laminated core according to a second embodiment of the present invention.
Figure 7:
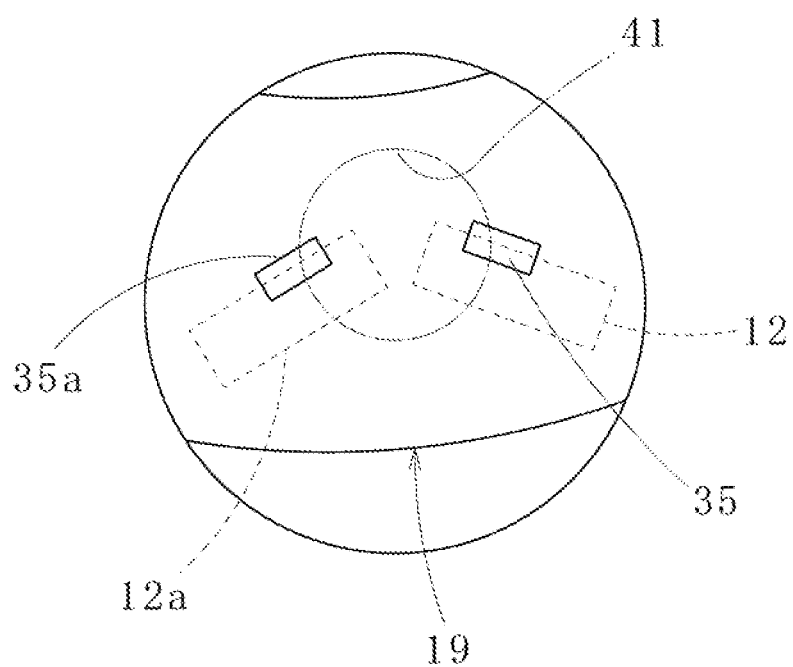
FIG. 7 is an explanatory diagram showing the method of manufacturing the laminated core.

Referring to FIGS. 6 and 7, a method of manufacturing a laminated core according to a second embodiment of the present invention will be explained. In the second embodiment, the same reference signs are used for elements. identical to those in the first embodiment shown in FIGS. 1 to 5, and detailed descriptions of the identical elements will be omitted.

As shown in FIGS. 6 and 7, unlike the method of manufacturing the laminated core according to the first embodiment of the present invention, the method according to the second embodiment does not include a runner provided in an upper die 40. A resin reservoir pot 41 is arranged such that the resin reservoir pot 41 partly overlaps with the gate hole 35 (or 35*a*) provided in the dummy plate 19 in a plan view. Particularly, a resin-discharge area of the resin reservoir pot 41 partly overlaps with the gate hole 35 (or 35*a*), and the resin 18 is discharged into the gate hole 35 (or 35*a*) directly from the resin reservoir pot 41.

In a plan view, the gate holes 35, 35*a* overlap with both of a) radially inward regions of the corresponding magnet insertion holes 12, 12*a* and b) surfaces of the core body 13 located in a radially inward direction from the magnet insertion holes 12, 12*a*. The resin 18 is injected into the magnet insertion holes 12, 12*a* from the resin reservoir pots 41 via the gate holes 35, 35*a*. The resin 18 cured and projected from each of the magnet insertion holes 12, 12*a* creates a step (dent), and a stress is concentrated on the step when the dummy plate 19 is removed from the core body 13. With this stress concentration, each end of the resin 18 at the magnet insertion holes 12, 12*a* becomes a flat and smooth plane without the dent. In addition, no runner is formed and thus no residual resin remains in the runner, which can reduce the amount of the resin used. A way to remove the cured resin 18 from the dummy plate 19 is the same as the way shown in FIG. 5.

Figure 8:
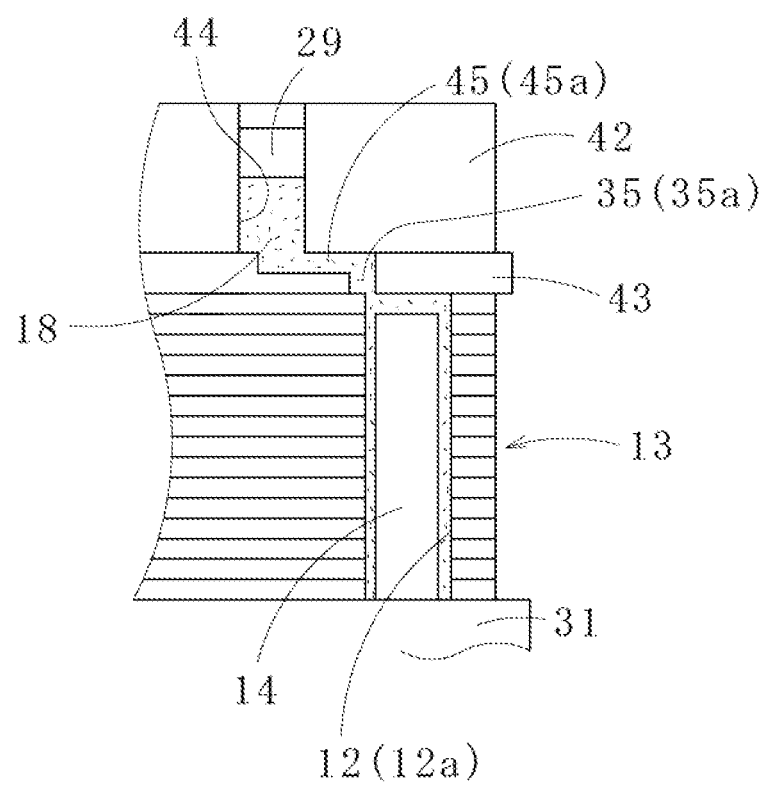
FIG. 8 is an explanatory diagram showing a method of manufacturing a laminated core according to a third embodiment of the present invention.

Referring to FIG. 8, a method of manufacturing a laminated core according to a third embodiment of the present invention will be explained. In this embodiment, resin reservoir pots 44 are provided in an upper die 42 such that each of the resin reservoir pots 44 is arranged in a different position from the gate holes 35, 35*a* provided in a dummy plate 43 in a plan view. The dummy plate 43 includes runners 45, 45*a* guiding the resin 18 from the resin reservoir pots 44 to the gate holes 35, 35*a*, respectively. Each of the runners 45, 45*a* has a groove shape (e.g., a rectangular groove shape) in cross-section. Also, an end of the runner 45 (or 45*a*) does not have to completely overlap with the resin reservoir pot 44. It is sufficient that a region of the runner 45 (or 45*a*) equal to or larger than a cross-sectional area of the runner 45 (or 45*a*) is exposed to the resin reservoir pot 44.

In the method according to the third embodiment, by removing the dummy plate 43 from the core body 13, each inlet face of the magnet insertion holes 12, 12*a* becomes a plane surface. The resin 18 attached to the dummy plate 43 is removed by the pointed tool in the same way as shown in FIGS. 4 and 5. In this embodiment, the dummy plate 43 includes the runners 45, 45*a*, and thus different types of the core bodies (i.e., the core bodies having the magnet insertion holes provided in different positions) can be sealed with resin by using the upper die 42 (or a lower die) having the resin reservoir pots 44.

Figure 9:
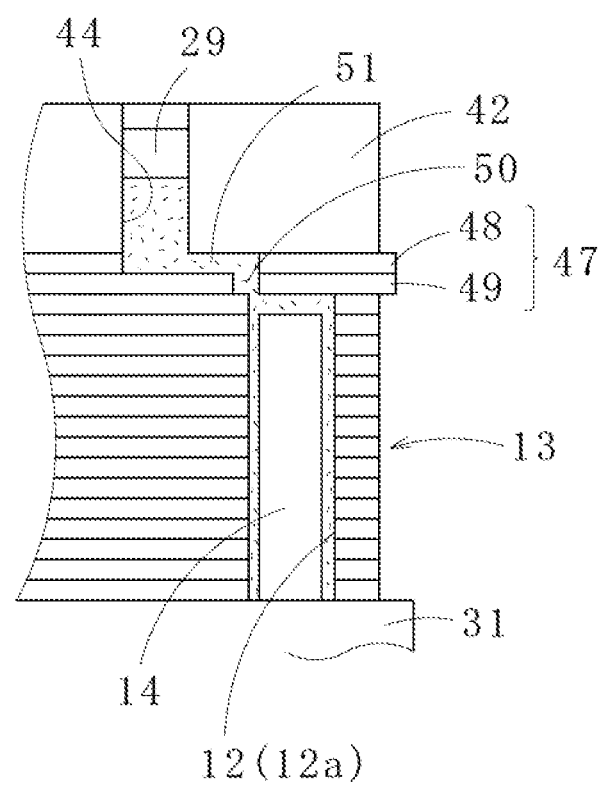
FIG. 9 is an explanatory diagram showing a method of manufacturing a laminated core according to a fourth embodiment of the present invention.
Figure 10A:
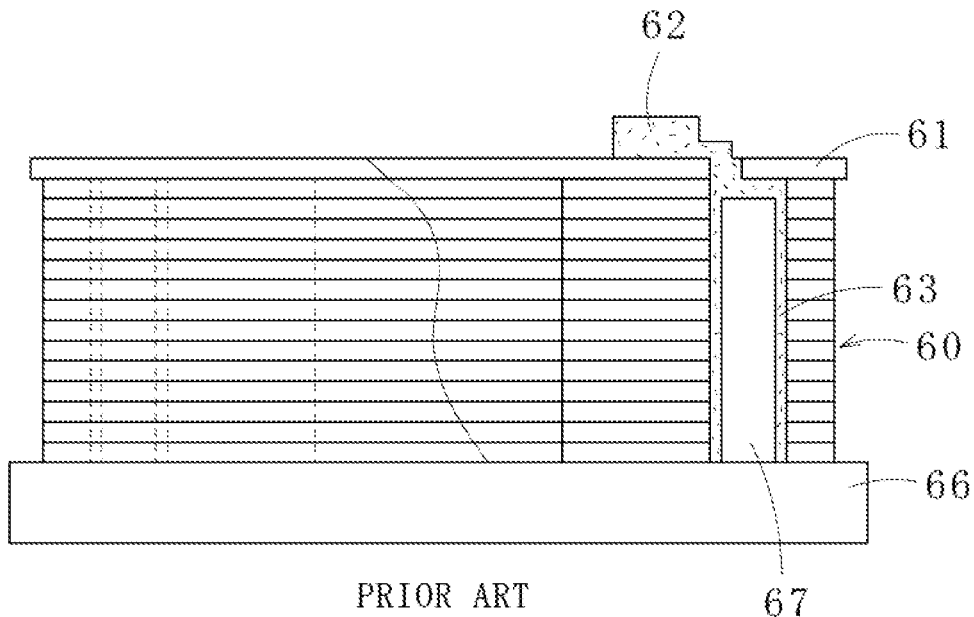
FIGS. 10(A) and 10(B) are explanatory diagrams showing a conventional method of manufacturing a laminated core using a dummy plate.
Figure 10B:
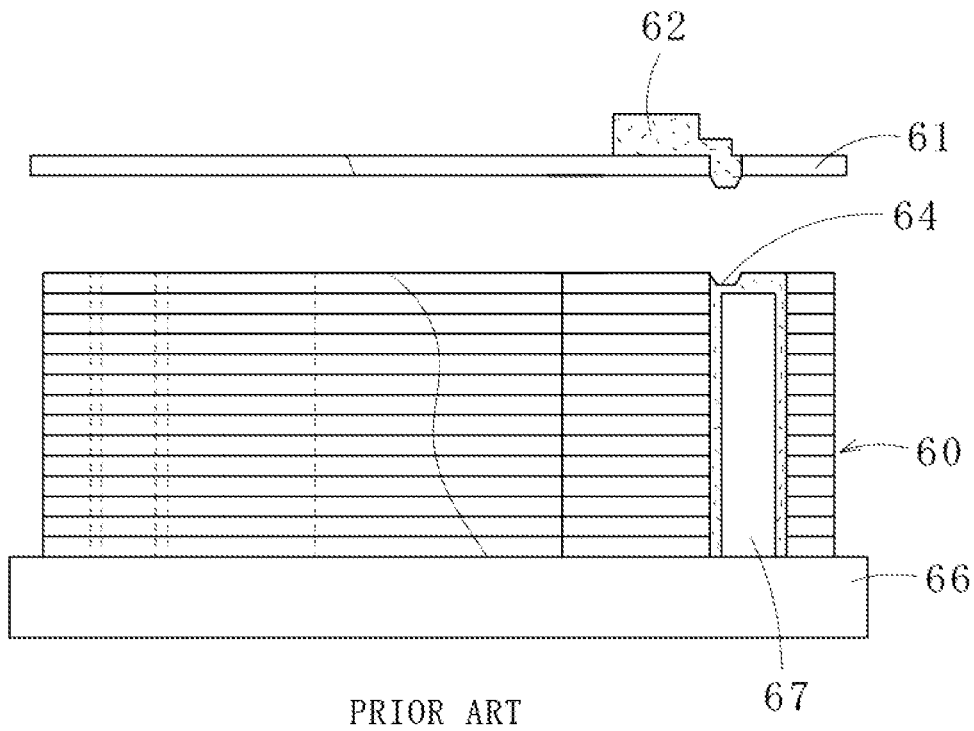

Referring to FIG. 9, a method of manufacturing a laminated core according to a fourth embodiment of the present invention will be explained. A dummy plate 47 used in the method according to the fourth embodiment includes two plates 48, 49. The plate 49 (a second plate) placed close to the core body 13 includes only gate holes 50. The plate 48 (a first plate) in contact with a die having the resin reservoir pots 44 (e.g., the upper die 42) includes pierced holes forming runners 51. Like the above embodiments, the gate holes 50 partly overlap with the magnet insertion holes 12, 12a. In this embodiment, the resin 18 from the resin reservoir pots 44 is poured into the gate holes 50 via the runners 51, and then is guided into the magnet insertion holes 12, 12a.

Like the above embodiments, by removing the dummy plate 47 from the core body 13, each end of the magnet insertion holes 12, 12a becomes flat. The residual resin can be removed by separating the dummy plate 47 into the plates 48, 49. In this embodiment, a core body having, magnet insertion holes provided in different positions from the above-described positions can be sealed with resin by using a pair of dies and a different type of the dummy plate 47.

The above embodiments are described by referring to an example of an inner-rotor-type laminated core, in which permanent magnets are preferably located in a radially outward direction of magnet insertion holes. For an outer-rotor-type laminated core, in which permanent magnets are preferably located in a radially inward direction of magnet insertion holes, it is preferable that gate holes are positioned so as to overlap with outlines in a radially outward direction of the magnet insertion holes.

In addition, the above embodiments are described for the case where the magnet insertion holes form plural pairs. However, the present invention can be applicable to a case where magnet insertion holes form no pair.

REFERENCE SIGNS LIST

10: core sheet, 11: through-hole. 12, 12a: magnet insertion hole, 13: core body, 14: permanent magnet, 15: upper die, 16: lower die, 17: resin reservoir pot, 18: resin. 19: dummy plate. 20: laminated core, 21: die device, 22: guide post, 21, 24: fixing plate, 25: cylinder, 26: elevating plate, 28: cylinder, 29: plunger, 31: mounting table, 32: support shaft, 33: carrier, 35, 35a: gate hole, 36, 36a: outline, 37, 37a: runner, 38: residual resin, 39: pointed tool, 40: upper die, 41: resin reservoir pot, 42: upper die, 43: dummy plate, 44: resin reservoir pot, 45, 45a: runner, 47: dummy plate, 48, 49: plate, 50: gate hole, 51: runner

The invention claimed is:

1. A method of manufacturing a laminated core, comprising:
    laminating a plurality of core sheets to form a core body having a plurality of magnet insertion holes in a circumferential direction,
    inserting permanent magnets into the respective magnet insertion holes, and
    injecting a resin from resin reservoir pots into the magnet insertion holes to fix the permanent magnets while holding the core body between an upper die and a lower die, the reservoir pots provided in a die A which is any one of the upper die and the lower die, the method further comprising:
    placing a dummy plate between the core body and the die having the resin reservoir pots, the dummy plate having gate holes guiding the resin from the resin reservoir pots into the magnet insertion holes via runners, each of the gate holes overlapping with both of a part of the magnet insertion hole and a surface of the core body,
    pouring the resin into the magnet insertion holes via the gate holes and curing the poured resin, and
    separating the dummy plate from the core body to remove the resin overflowed from the magnet insertion holes,
    wherein the runner is provided in a surface of the dummy plate in contact with the die having the resin reservoir pots.

2. The method of claim 1, wherein the laminated core is an inner rotor, and each of the gate holes overlaps with each of the magnet insertion holes from each radially inward side of the magnet insertion holes.

3. The method of claim 2, wherein
    the core body includes a through-hole in a center of the core body;
    the core body includes a positioning means A provided in the through-hole, the positioning means A formed by one of a projecting portion and a key groove;
    the core body is arranged between the upper die and the lower die in a way that the core body is attached to a fixture having a support shaft and a flat plate, the support shaft to be inserted in the through-hole, the support shaft having a positioning means B engaging with the positioning means A, the flat plate having the support shaft arranged in a vertical manner; and
    the dummy plate is arranged in a predetermined position in the core body, the dummy plate having a positioning means C engaging with the positioning means B.

4. The method of claim 2, wherein the die A is an upper die.

* * * * *